(12) United States Patent
Dien

(10) Patent No.: US 10,823,133 B2
(45) Date of Patent: Nov. 3, 2020

(54) OCEAN CURRENT POWER GENERATION SYSTEM

(71) Applicant: Ghing-Hsin Dien, Taipei (TW)

(72) Inventor: Ghing-Hsin Dien, Taipei (TW)

(*) Notice: Subject to any disclaimer, the term of this patent is extended or adjusted under 35 U.S.C. 154(b) by 0 days.

(21) Appl. No.: 16/835,212

(22) Filed: Mar. 30, 2020

(65) Prior Publication Data

US 2020/0318601 A1 Oct. 8, 2020

Related U.S. Application Data

(63) Continuation-in-part of application No. 16/377,140, filed on Apr. 5, 2019.

(51) Int. Cl.
*F03B 13/10* (2006.01)
*H02K 7/18* (2006.01)

(52) U.S. Cl.
CPC ........... *F03B 13/10* (2013.01); *H02K 7/1823* (2013.01)

(58) Field of Classification Search
CPC .............................. F03B 13/10; H02K 7/1823
See application file for complete search history.

(56) References Cited

U.S. PATENT DOCUMENTS

| | | | | |
|---|---|---|---|---|
| 4,060,344 A | * | 11/1977 | Ootsu | F03B 13/144 417/330 |
| 2012/0201664 A1 | * | 8/2012 | McCants | F03B 7/00 415/202 |
| 2015/0285209 A1 | * | 10/2015 | Sepp | F03B 13/10 290/54 |
| 2015/0369258 A1 | * | 12/2015 | Sakamoto | F04D 13/06 415/121.3 |
| 2016/0290310 A1 | * | 10/2016 | Bhende | F03B 13/086 |

* cited by examiner

*Primary Examiner* — Tulsidas C Patel
*Assistant Examiner* — Joseph Ortega
(74) *Attorney, Agent, or Firm* — Cheng-Ju Chiang

(57) ABSTRACT

An ocean current power generation system which uses an inlet pipe to redirect the ocean current to a pool at the sea surface for power generation, the ocean current's kinetic energy is transformed into potential energy when the water flows into the pool and stored therein, an outlet pipe or path drains the stored water back to the sea and a generator or turbine is installed at the drainage path to generate electric power.

4 Claims, 9 Drawing Sheets

OCEAN CURRENT POWER GENERATION SYSTEM

CROSS REFERENCE TO RELATED APPLICATIONS

This application is a Continuation-In-Part of U.S. application Ser. No. 16/377,140 filed on Apr. 5, 2019, which is a Continuation-In-Part of U.S. application Ser. No. 15/172,153 filed on Jun. 3, 2016, which claims priority under 35 U.S.C. § 119(a) on Patent Application No(s). 104118274 filed in Taiwan, Republic of China on Jun. 5, 2015, the entire contents of which are hereby incorporated by reference.

BACKGROUND OF THE INVENTION

Field of Invention

The present invention relates to an ocean current power generation system.

Related Art

Generally the present ocean current power generation systems use undersea turbine generators with blades to collect the ocean current's kinetic energy to generate electric power, and transmit the electric power to land with undersea power cables. The undersea turbine generators must be water-proof and connected to the power cables under the sea. As one can imagine, the undersea turbine generators must resist against high water pressure, strong ocean current and the corrosion of salt water, so it is expensive to build and difficult to maintain. The rotating blades also cause impacts to fishing fields. Fishing boats must keep their fishing nets or wires from being tangled with the blades of the undersea turbine generators. Also, the undersea power cables and turbine generators generate magnetic field interferences to marine creatures. Based on the limitations of costs and technologies, the ocean current power generator system is mostly still under development.

Therefore, in order to make the ocean current power generation more available, it is an important subject to provide a low cost system that uses low cost generators and is easy to maintain, and most importantly, is friendly to the environment.

SUMMARY OF THE INVENTION

In view of the foregoing, an objective of the present invention is to provide an ocean current power generation system that does not use undersea turbine generators and can be built with lower costs and requires lower maintenance fees. Another objective of the present invention is to provide an ocean current power generation system that has little impact to the traditional fishing field and does not generate magnetic field interferences to marine creatures.

To achieve the above objectives, the present invention discloses an ocean current power generation system. The ocean current power generation system includes a water pool, at least one inlet pipe, a drainage means and a generation device. The water pool is disposed near or at the sea with pool walls higher than the sea level to stop water flow and store sea water from the ocean current. The at least one inlet pipe includes an exit and at least one entrance. The exit is connected near to a bottom of the water pool. The at least one entrance is disposed at and facing an ocean current in the sea to redirect a part of the ocean current to flow by itself into the entrance to the exit and to the water pool and stored therein. When the flowing-in ocean current reaches the water pool and is kept from flowing back to the sea by pool walls and stored, the kinetic energy of the flowing-in ocean current from the entrance is transformed into a potential energy when the flowing-in sea water is kept from flowing back to the sea by pool walls and stored in the water pool so the flowing-in ocean current creates a higher water level in the water pool higher than the sea level around the water pool. The drainage means includes at least one outlet pipe or path connected near to the bottom of the water pool and has a drainage output to the sea below the sea level around the water pool. The drainage output is near a shore where it's not near the ocean current, or the drainage output does not face the ocean current. When the water level of the stored sea water in the water pool is higher than the sea level around the water pool, the stored sea water in the water pool can be drained back to the sea of the lower sea level around the water pool through the outlet pipe or path. The generation device includes a flow control means and a hydro turbine generator. The flow control means is configured to control the drainage flow to the outlet pipe or path, and to control the storage of water in the pool. A lower drainage flow results in a higher water level in the pool, and a higher drainage flow results in a lower water level in the pool. The hydro turbine generator is disposed at the drainage path of the outlet pipe or path, and uses the draining water flow from the water pool to the outlet pipe or path to generate electric power.

In one embodiment of the present invention, the water pool is disposed at the shore.

In one embodiment of the present invention, the water pool is disposed at the surface of the sea, and is fixed by a supporting frame or anchored to the seabed.

In one embodiment of the present invention, the inlet pipe has an enlarged entrance as a concentrator to collect more ocean current.

As mentioned above, the ocean current power generation system of the invention does not need undersea generators (turbines), the major parts under the sea is the inlet pipes and the outlet pipes (or paths) which do not require constant maintenance and have a long life time. The power cables and hydro turbine generators can be placed onshore and do not need to resist the high water pressure and salt-water corrosion. Accordingly, the goal of reduced system costs and maintenance fees are achieved. Also, there is no magnetic field interferences to marine creatures and the impact to the traditional fishing field is little.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references refer to the same elements.

Figure 1:
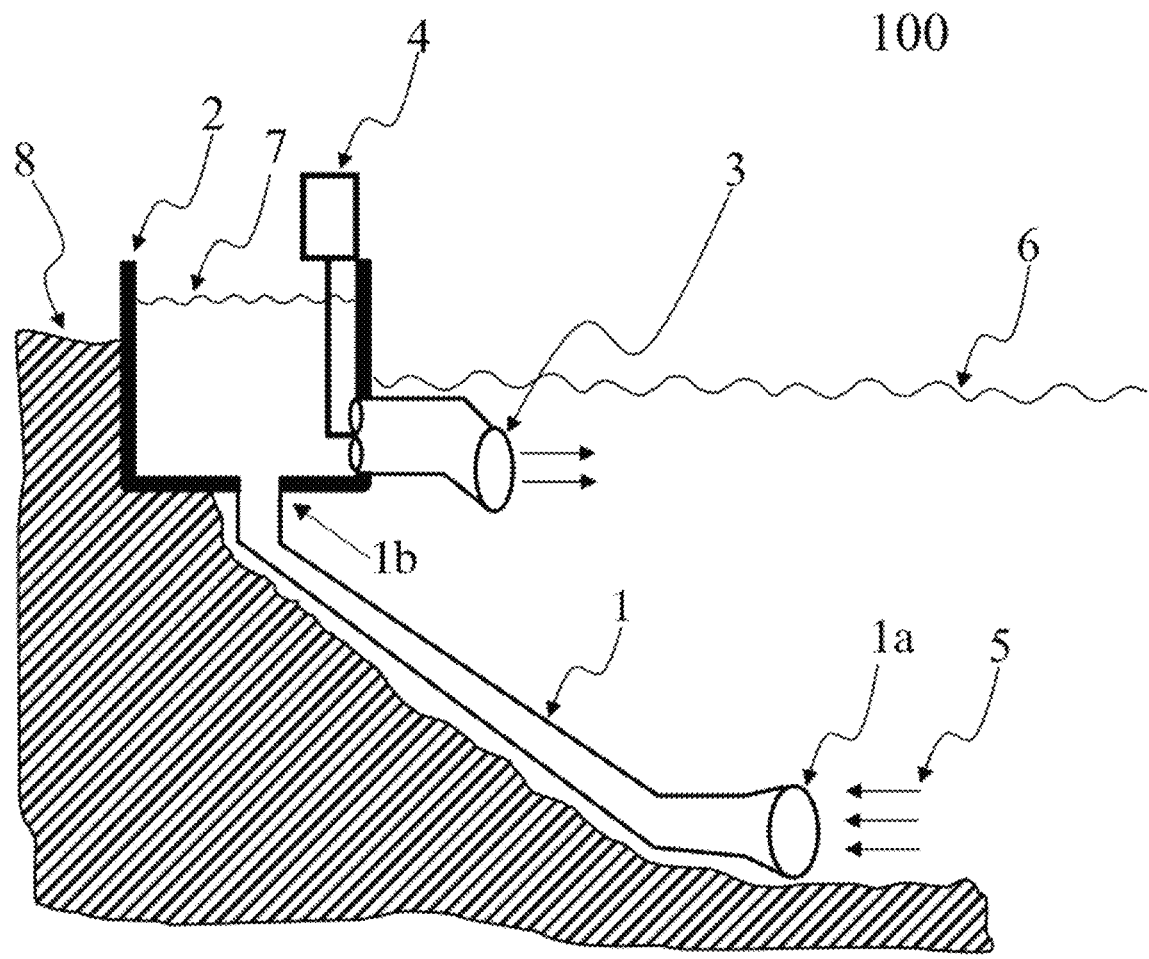
FIG. 1 is a system diagram showing an ocean current power generation system according to a first embodiment of the invention.

FIG. 1 is a system diagram of an ocean current power generation system according to a first embodiment of the invention.

Referring to FIG. 1, an ocean current power generation system 100 includes an inlet pipe 1, a water pool 2, an outlet pipe 3, and a generation device. The generation device includes a flow control system 10 and a hydro turbine generator 4. The flow control system 10 is a control part for the hydro turbine generator 4. The flow control system 10 can be integrated in the hydro turbine generator 4. The entrance 1a of the inlet pipe 1 is disposed near to the ocean current 5, the inlet pipe 1 collects and redirects the ocean current 5 to flow to the water pool 2. The water pool 2 is installed near the shore 8 and stores the inflow water. The water level 7 of the water stored in the water pool 2 is higher than the sea level 6, and so the kinetic energy of the inflow water transforms into potential energy. The water stored in water pool 2 is drained back to the sea through the outlet pipe 3. The hydro turbine generator 4 is installed at the drainage path and uses the draining water flow to generate electric power. The outlet pipe 3 can be replaced by an open water path to the sea.

The ocean current power generation system 100 uses an inlet pipe 1 to redirect the ocean current to flow to a water pool 2 at the sea surface and transforms kinetic energy of the ocean current into potential energy when the water is stored in the pool. The ocean current power generation system 100 uses an outlet pipe 3 (or path) connected to the sea to drain the stored water back to the sea and thus the potential energy of the water stored in the water pool 2 then transforms back to kinetic energy for the operation of the hydro turbine generator 4, and then such kinetic energy is transformed to electric power by the hydro turbine generator 4. In detail, as the ocean current is redirected to the water pool 2 and stored in the pool, its kinetic energy is transformed into potential energy with the following formula:

$$\tfrac{1}{2}MV^2 = Mgh$$

Where M=mass of water, V=velocity of water, g=9.8 m/s$^2$, and h=the difference in height between the stored water level 7 and the sea level 6.

For example, an ocean current with a flowing speed of 3 meter per second will create an emerging water of 0.46 meter height above the sea level, the 0.46 meter would be the maximum available hydraulic head (when water is still), after deducting the friction loss in the pipe (when water is flowing), the remaining hydraulic head (above the sea level) could be used to generate power, and could be stored in potential energy form and thus create a water level higher than the sea level around the pool. When the water is drained back to the sea, the stored potential energy is transformed into kinetic energy and then electric power with a power generator.

To increase the water flowing speed in the inlet pipe 1, the inlet of the inlet pipe 1 can be enlarged (with concentrators or shrouds), or multiple inlets can be installed for one inlet pipe 1 to collect more ocean current. Because the ocean current is a large-area constant-speed water flow, so when an enlarged inlet or multiple inlets are pushed by the ocean current and the collected flowing water is concentrated and flows into the inlet pipe, the water flowing speed in the inlet pipe 1 can be effectively increased. Therefore, the inflow water speed of the water pool 2 is increased and so the draining outflow water speed can be increased, eventually the generated electric power can be increased. For example, like the well-known wind concentrators can do for wind turbines, if a concentrator is used and the inflow speed in pipe 1 is doubled by the concentrator, according to the previously mentioned formula $\tfrac{1}{2}MV^2 = Mgh$, a doubled speed V can create a 4-times water level h or a 4-times available hydraulic head, and thus, after deducting the friction loss of pipe 1 (when water is flowing), the remaining hydraulic head for power generation is effectively increased. And with multiple inlets (multiple pipes) it not only can increase the inflow rate, but also can greatly reduce the friction loss of inlet pipes. For example, if five inlets (inlet pipes) are used to collect the ocean current and the total inflow rate is kept the same as when using a single pipe, each one of the five inlets (pipes) would only need to provide ⅕ of the original inflow speed of a single pipe, since the slower the flowing speed the smaller the friction loss of a pipe, therefore the friction loss can be greatly reduced in each pipe. So when using 5 pipes, either the total inflow rate is kept the same while with a smaller friction loss, or with the same inflow speed of a single pipe and the inflow rate is increased to its 5 times (in total of 5 pipes) while with the same friction loss of a single pipe, both conditions all can effectively increase the available water flow or hydraulic head for generating power. Therefore by using a concentrator and/or using multiple inlets (pipes) to increase the inflow speed or rate and reduce the impact of friction loss, the remaining hydraulic head for generating power therefore can be effectively increased.

Figure 2:
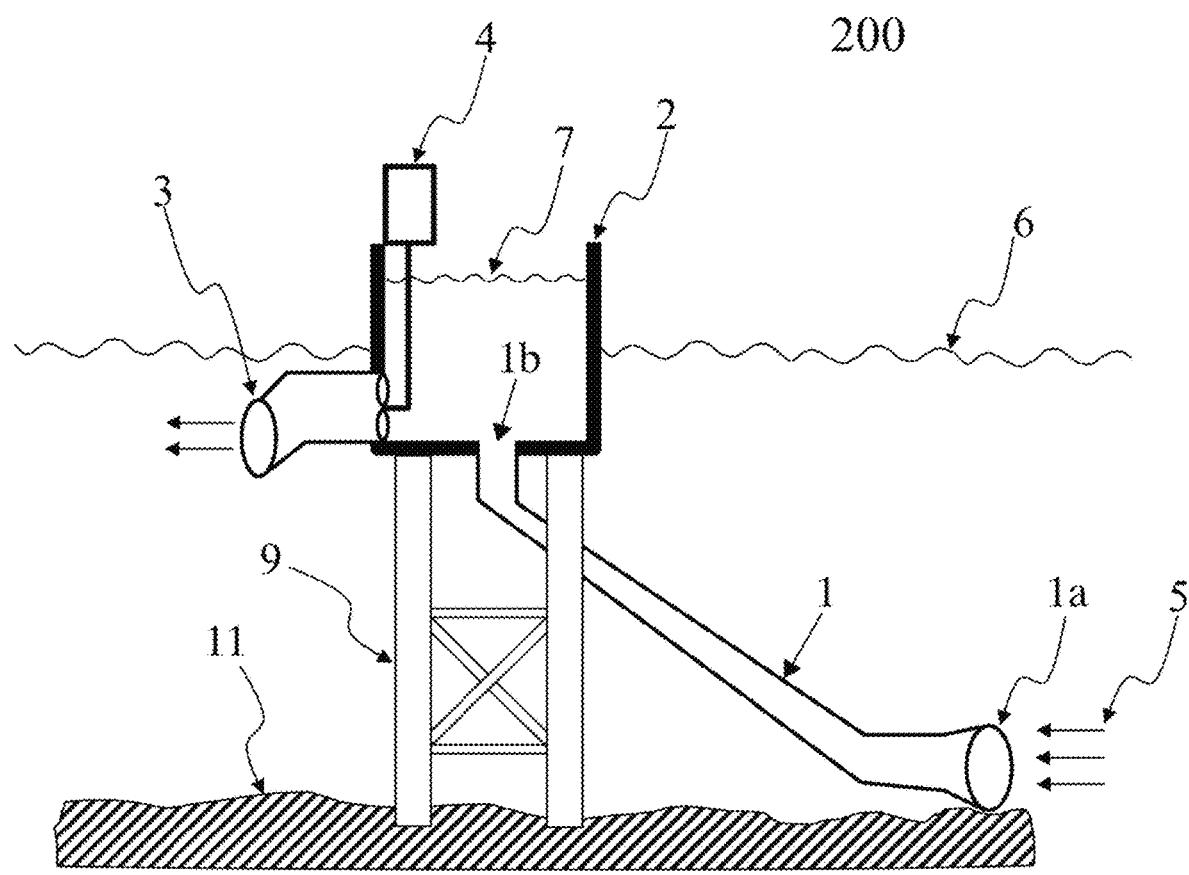
FIG. 2 is a system diagram showing an ocean current power generation system according to a second embodiment of the invention.

FIG. 2 is a system diagram of an ocean current power generation system according to a second embodiment of the invention.

Referring to FIG. 2, an ocean current power generation system 200 according to a second embodiment of the invention includes an inlet pipe 1, a water pool 2, an outlet pipe 3, a flow control system 10 and a hydro turbine generator 4. The flow control system 10 is a control part of the hydro turbine generator 4. The ocean current power generation system 200 is substantially the same as the ocean current power generation system 100 at most parts. The ocean current power generation system 200 is different from the ocean current power generation system 100 in FIG. 1 as described as following. The water pool 2 in FIG. 2 is installed at the sea surface by the supporting frame 9 near the ocean current 5. Similar to their counterparts of the ocean current power generation system 100, the water level 7 of the water stored in the water pool 2 is higher than the sea level 6, the water in water pool 2 is drained back to the sea through the outlet pipe 3. The hydro turbine generator 4 is installed at the drainage path and uses the draining water flow to generate electric power. Although in FIG. 2 the supporting frame 9 is built on the ocean floor 11 (seabed), it is possible that the water pool 2 is left floating on the sea and anchored to the seabed. The outlet pipe 3 can be replaced by an open water path to the sea. Since the water pool 2 in FIG. 2 can be installed near the ocean current or right at the sea surface of the ocean current, the inlet pipe 1 can be installed with a minimum length and its friction loss is also at its minimum, as shown in FIG. 2 the inlet pipe 1 is installed under the pool and its length can be very short, even as short as several meters is possible, so the friction loss can be reduced to a minimum. Besides, by using the previously mentioned concentrator and multiple inlet pipes to increase the inflow of water, the collected hydraulic head from the ocean current can be relatively large compared to the friction loss of the pipe, so the available energy for generating power could be effectively increased.

In order to let the inlet pipe 1 collect and redirect the ocean current 5 to flow to the water pool 2 efficiently, it is preferable that the entrance 1a of inlet pipe 1 (and its concentrator) is facing directly at the ocean current. In the case of a tidal current which changes directions regularly, as previously mentioned, multiple entrances can be installed for pipe 1, or multiple inlet pipe 1 can be installed with different directions, and control valves can be used to switch or select between the multiple entrances according to the direction of the incoming tidal current.

In order to let the water flow from inlet pipe 1 and flow out of outlet pipe 3 as planned, the hydraulic head from inlet pipe 1 (or the water level in pool 2) must be higher than the hydraulic head from pipe 3, so it is preferable that the draining output of outlet pipe 3 is installed at where there is no ocean currents, or the draining output of outlet pipe 3 is not facing any ocean current directly, so that no current can flow into the outlet pipe 3 and the hydraulic head from pipe 3 would be, basically, zero. In the case that there might also be currents near the outlet pipe 3, for instance, if the right-to-left ocean current 5 in FIG. 1 also exists at the draining output of pipe 3, the pipe 3 can be moved to a new location where there is no ocean current exists, or one can simply turn the draining output of pipe 3 facing down or facing left (not facing right as in FIG. 1), so that no ocean current can flow into the pipe 3. If pipe 3 in FIG. 2 is installed at a tidal current which will change its direction regularly, it is preferable to have the draining output of pipe 3 facing down to avoid any inflow current from any directions (left or right). If the inflow current from pipe 3 is inevitable for some reason, the water in pool 2 can still be successfully drained through pipe 3 as long as the hydraulic head from pipe 1 (or the water level in pool 2) is higher than the hydraulic head from pipe 3, and since the hydraulic head from pipe 1 is proportional to the square of the water inflow speed in pipe 1, as previously mentioned in preceding paragraphs, one can increase the water flowing speed in the inlet pipe 1 with enlarged concentrators to overcome the hydraulic head from pipe 3. It is also possible that multiple pipe 3 or a single pipe 3 with multiple outputs are used, each of them can face different directions when necessary, and control valves can be used when it is necessary to select between multiple outputs to drain the water successfully.

Figure 3:
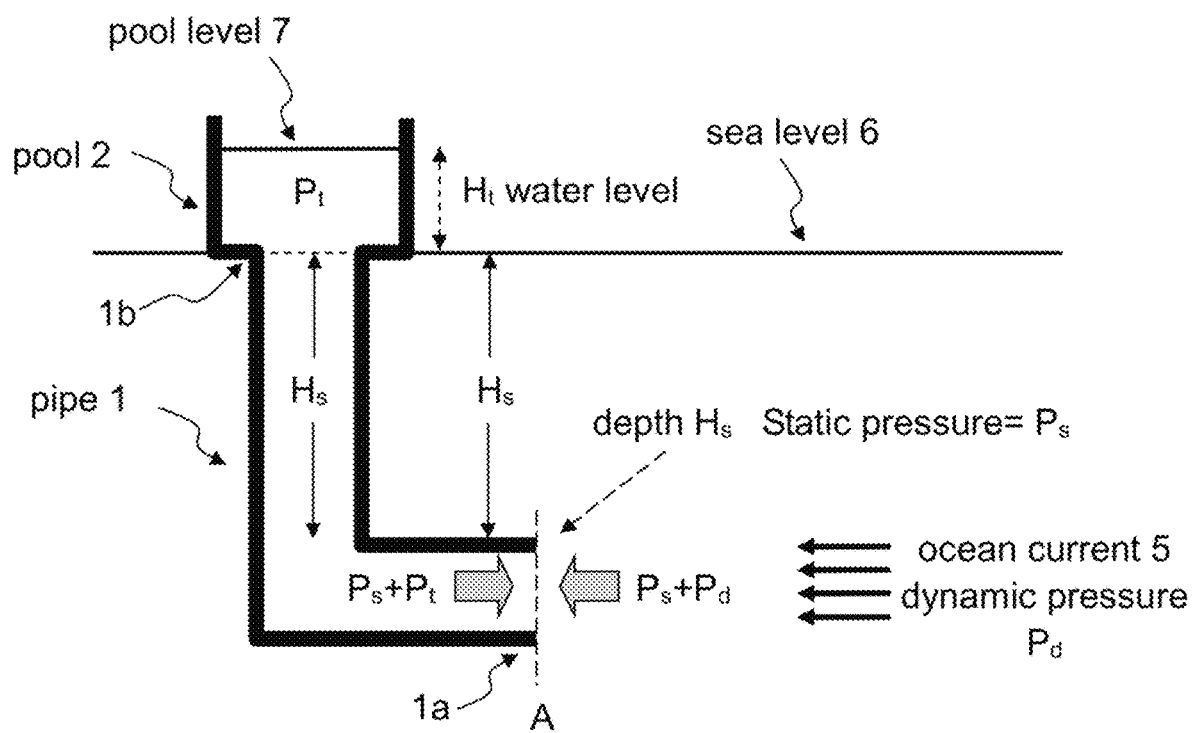
FIG. 3 is a diagram showing how the kinetic energy is transformed into potential energy.

As previously mentioned in preceding paragraphs, the ocean current's kinetic energy is transformed into potential energy, please refer to FIG. 3 for further details, FIG. 3 is like a well-known simple Pitot tube, in FIG. 3 the inlet pipe 1's entrance 1a is at the depth Hs under the sea and faces the ocean current 5, the entrance's cross section area is A, and the static pressure at depth Hs is Ps, the entrance 1a is facing the ocean current 5 and its dynamic pressure Pd, Pd will push the sea water flowing from the entrance 1a through an exit 1b to water pool 2 and emerging above the sea level in pool 2, and create a water level Ht higher than the sea level in pool 2. When the water stops flowing in pipe 1, it means the left-side and right-side pressures are equal at cross section A, the right-side pressure is equal to the sum of static pressure Ps and dynamic pressure Pd (i.e. the stagnation pressure=Ps+Pd), because the entrance 1a is at the same depth Hs under the sea, so the left side of cross section A at entrance 1a has the same static pressure Ps, and the total left-side pressure is equal to the sum of the static pressure Ps and the pressure of the pool Pt with water level Ht (Ps+Pt), which means at cross section A, when water stops flowing in pipe 1, Ps+Pd is equal to Ps+Pt (Ps+Pd=Ps+Pt), so when the water in pipe 1 stops flowing, we can get Pd=Pt, which means the dynamic pressure Pd is converted into pressure due to elevation Pt (or Hydraulic head above the sea level), so we say the ocean current's kinetic energy (Pd) can be transformed into potential energy (Pt). One thing to be noted is that when water is flowing there is friction loss in pipe 1 and the water flow can be slowed down in pipe 1, but since the friction loss is proportional to the square of the flowing speed in the pipe, the slower the water flows the smaller the friction loss, and the friction loss is zero when water is not flowing, so eventually when the water stops flowing and reaches a static state, Pd is fully converted into Pt, the friction loss only slows down the water flow and delays the time to reach the static state, the longer the pipe the more time needed to reach static balanced state. After the sea water flows to pool 2 and creates a water level Ht above the sea level, if we now drain the water in pool 2 back to the sea, the water level Ht goes down when the pool is drained, and Pt will go down too, therefore dynamic pressure Pd becomes greater than Pt and their pressure difference at cross section A will push the sea water to flow into pipe 1 to pool 2, the difference of Pd and Pt decides the flowing speed in pipe 1, the lower the Pt the greater the difference and the higher the inflow speed of water, when the water inflow speed is equal to the draining speed, the system will reach a balanced state and maintain the new water level Ht at a constant height lower than its maximum, and at this balanced state the continuously drained water can be used to generate power. Since hydro turbine generator 4 is installed at the draining path, the draining water must have enough hydraulic head to push the blades of hydro turbine generator 4 to flow through, so the water in pool 2 must reach the minimum hydraulic head for hydro turbine generator 4 before it can be successfully drained through hydro turbine generator 4's blades, and before reaching the minimum hydraulic head, the water is mostly stopped or slowed down from draining by hydro turbine generator 4's blades, so when the hydraulic head is not enough, the inflowing water from pipe 1 will not be successfully drained and so the continuing inflow will increase the water level Ht in pool 2 until the required hydraulic head for rotating hydro turbine generator 4 is reached. Besides, hydro turbine generators generally have a flow control system to control the amount of draining water to its blades in order to control the rotating torques and the power generated, the flow control system of hydro turbine generator 4 can also be used to control the draining of water pool 2 to reach the desired water level Ht.

Figure 8:
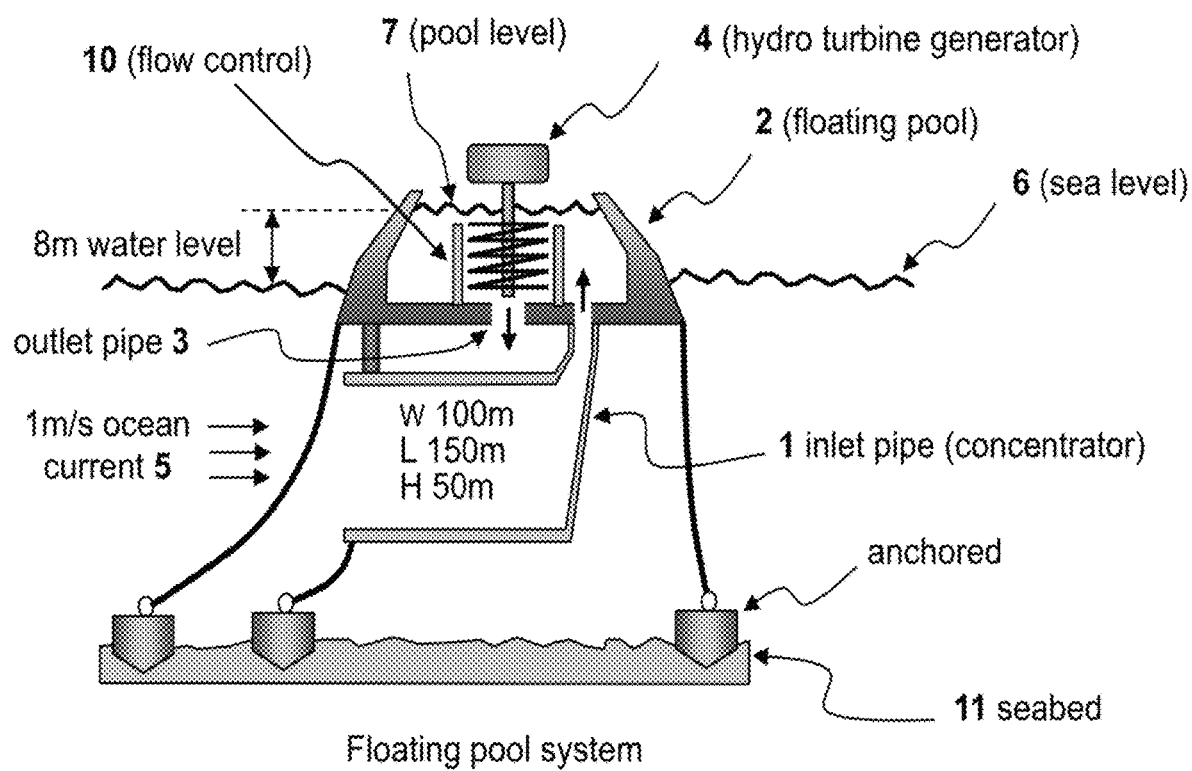
FIG. 8 is a system diagram showing an ocean current power generation system using a floating pool and a concentrator.
Figure 9:
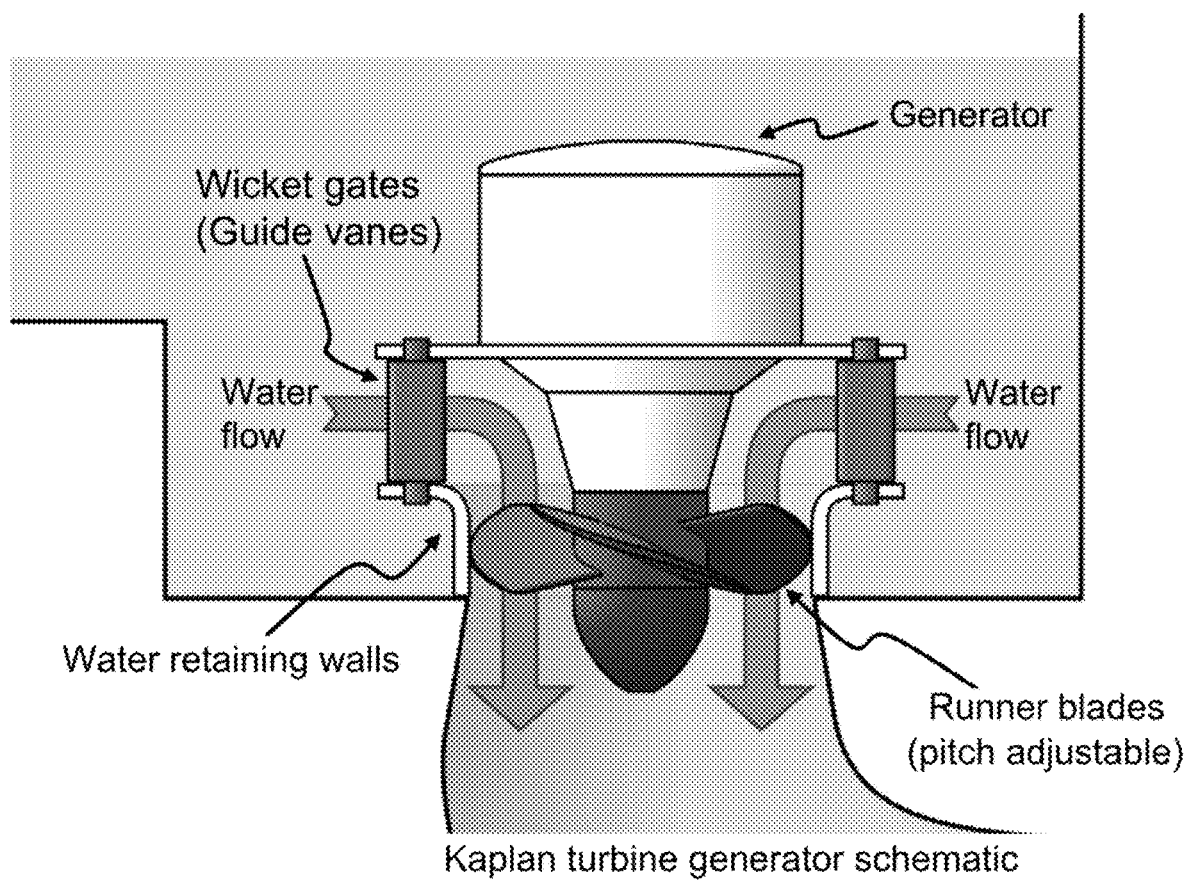
FIG. 9 is a conventional Kaplan turbine generator schematic example.
Figure 10:
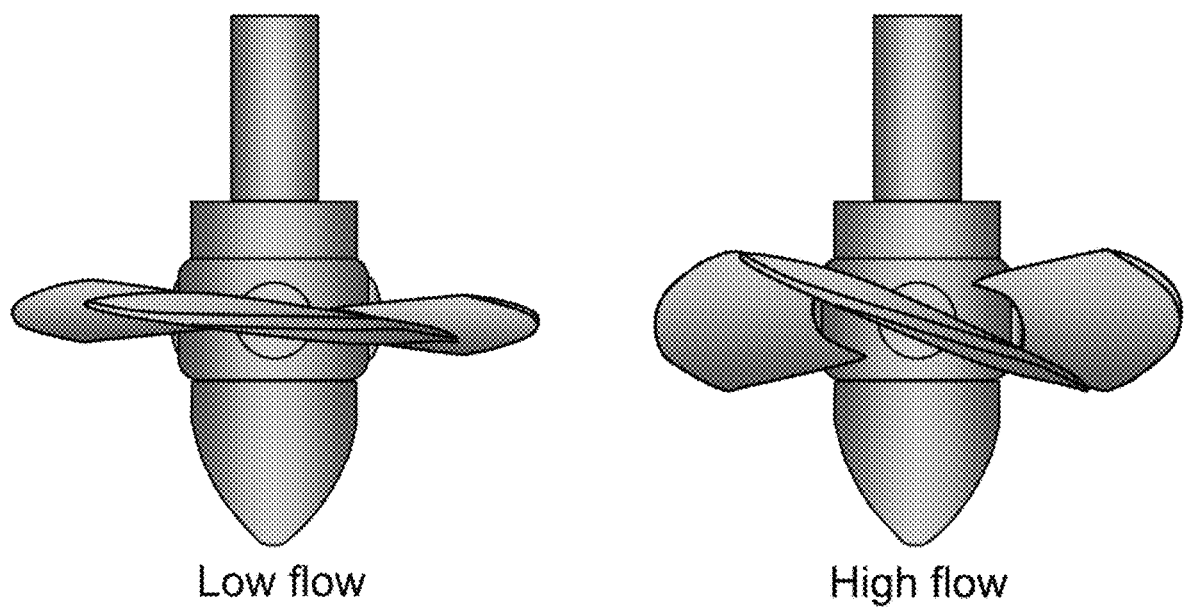
FIG. 10 is two Kaplan turbine runners with adjustable blades at different pitch positions for low flow and high flow.
Figure 11:
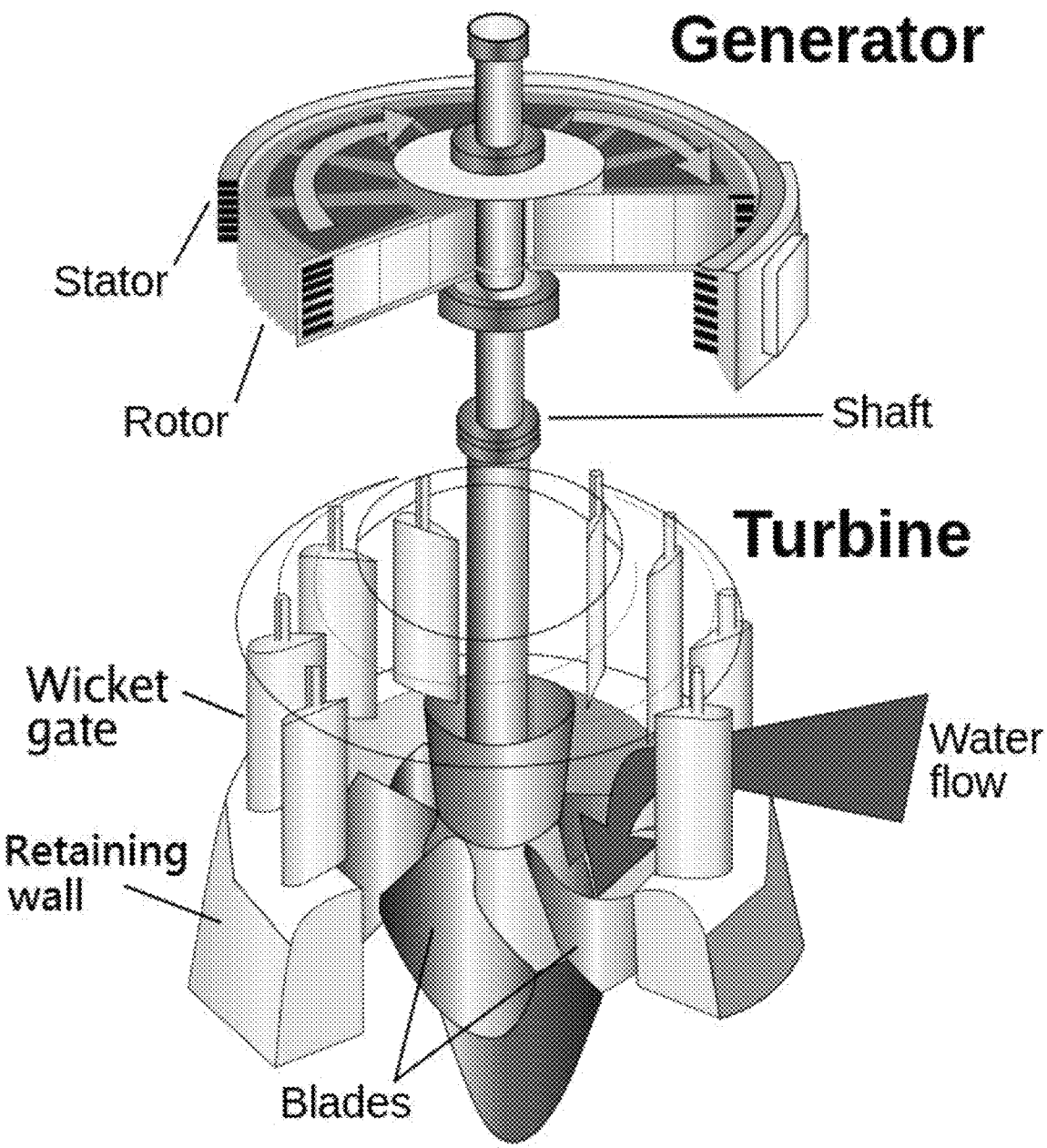
FIG. 11 is a 3D diagram example of a conventional Kaplan turbine generator.

FIG. 9 shows an example of the hydro turbine generator 4, the schematic of a conventional Kaplan turbine generator is shown, in FIG. 9 there are wicket gates (guide vanes)

which can change their pitches to control the water flow, and the water retaining walls set a minimum depth for the water to overflow into the turbine, the runner blades are also pitch adjustable to control the water flow, so in FIG. 9 the flow control system of a conventional Kaplan turbine includes the wicket gates, the water retaining walls and the adjustable runner blades. FIG. 10 shows two runners with adjustable blades at different pitch positions, the left one shows the blade position at a low flow condition, and the right one shows the blade position at a high flow condition. FIG. 11 shows a 3D diagram of a conventional Kaplan turbine generator, there are wicket gates and retaining walls to control the water flow. By implementing the conventional methods, the flow control system 10 in FIG. 1 and FIG. 2 can use the adjustable blades of the runner to control the water flow. FIG. 8 is another embodiment of the invention and the flow control system 10 in FIG. 8 can use adjustable wicket gates to control the water flowing rate and direction, or it can use water retaining walls (probably with adjustable heights or gates) to control the minimum depth of water to overflow into the turbine, or it can be a combination of wicket gates and retaining walls. Except Kaplan turbine generators, there are other various types of hydro turbine generators available for the application.

Figure 4:
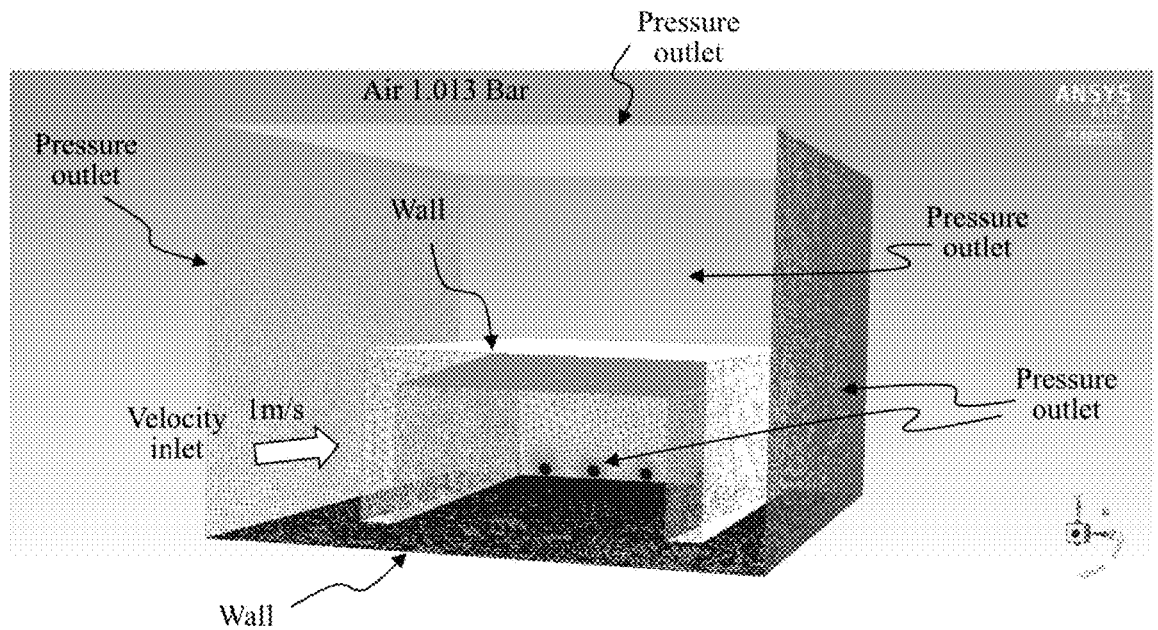
FIG. 4 is a diagram showing the computer mesh model of a concentrator for software simulation.
Figure 5:
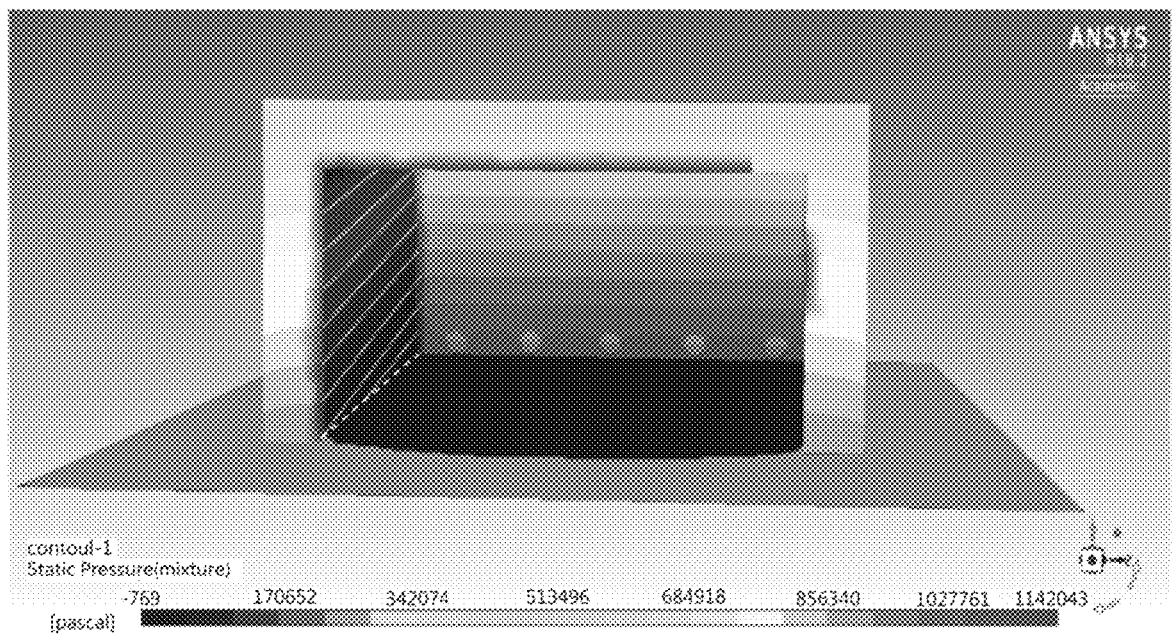
FIG. 5 is a diagram showing the 3D isobaric chart of the simulation result from the concentrator of FIG. 4.
Figure 6:
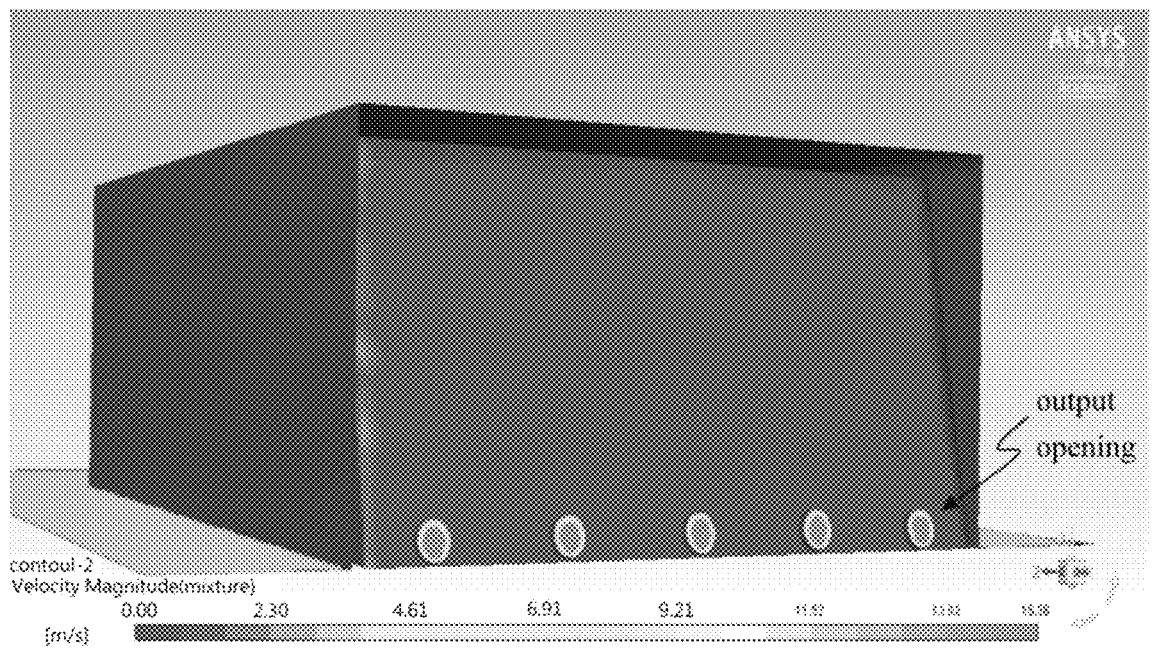
FIG. 6 is a diagram showing the fluid velocities at the output holes from the simulation results of the concentrator of FIG. 4.
Figure 7:
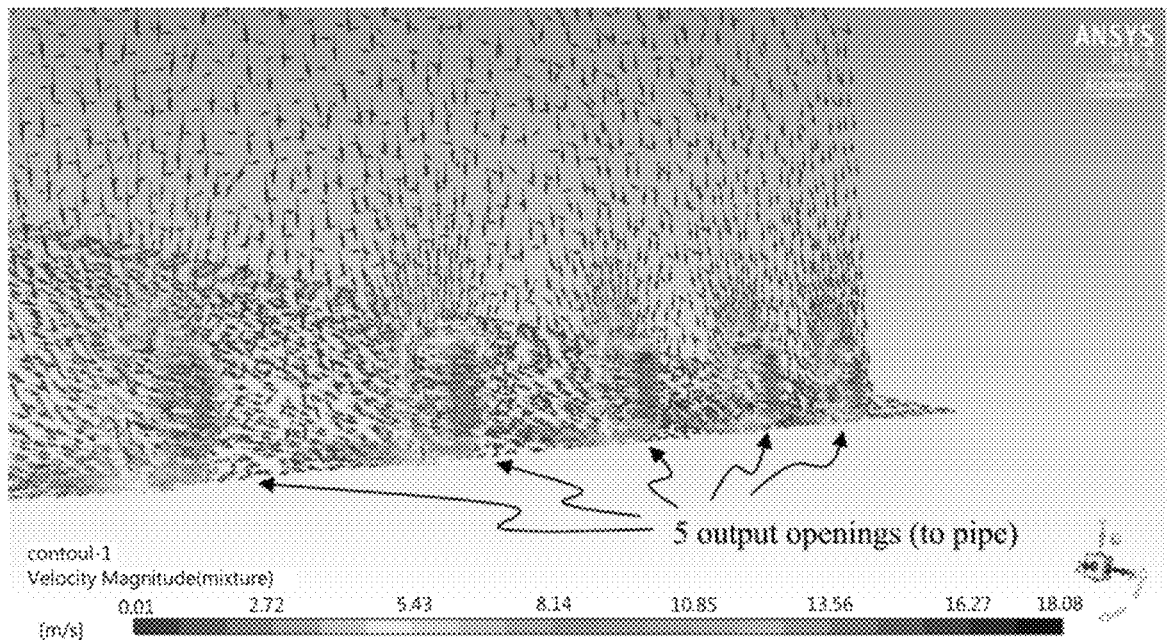
FIG. 7 is a diagram showing the water flow vectors from the simulation results of the concentrator of FIG. 4.

According to previous paragraphs, the entrance of pipe 1 can be enlarged with concentrators to collect ocean currents and speed up its flowing. Please refer to FIG. 4, FIG. 4 shows an example of a large concentrator's computer mesh model designed to collect ocean currents, the concentrator's computer mesh model is designed with ANSYS fluid simulation software, the concentrator has an entrance of 100 m in width and 50 m in height, and a body of 150 m long and 10 m thickness of wall, at its rear wall there are five round holes of 5 m diameter (pipes can be connected here to the pool), the concentrator is placed in a simulation box of sea water with 100 m depth, 150 m width and 200 m long, and a 10 m height of air is placed above the sea surface with 1.013 BAR of pressure. The sea surface at the top side of the box, left and right sides of the box, rear side of the box and the 5 round holes of the concentrator are all configured as Pressure-outlet in ANSYS, and the walls of the concentrator and the seabed at the bottom of the box is configured as Wall, the front side of the box is configured as Velocity-inlet and a 1 m/s ocean current is set to flow toward the entrance of the concentrator. This model is used to simulate the concentrator in a 1 m/s ocean current and to estimate the output flowing speed at the 5 round holes without pipes connected, and to estimate the efficiency of the concentrator. After running ANSYS simulation with the model of FIG. 4, please refer to FIG. 5 to FIG. 7 for the results, FIG. 5 shows the 3D isobaric chart inside the concentrator, from FIG. 5 we can see the isobaric ladder climbs up as it gets deeper inside the concentrator, which means at the same depth of the sea, the more we get inside the concentrator the higher the pressure, the ocean current is concentrated and turned into higher pressure, and finally the higher pressure is released through the 5 round holes at the rear wall of the concentrator, so in FIG. 5 it shows that the pressure is released at the 5 round holes. From the pressure scale bar at the bottom of FIG. 5, we can learn that the highest pressure inside the concentrator's rear bottom is 1142043 Pascal=11.42 Bar, since the depth there is 100 m under the sea, and a 11.42 Bar is equal to about 116 m of hydraulic head, so if we connect a pipe from the rear wall round holes to up to the sea level, we can obtain a 16 m hydraulic head above the sea level in the pipe. It should be noted that if the holes are moved to the rear wall's upper area (not at the lower area as in FIG. 4), we can still get a 16 m hydraulic head above the sea level in the pipe because the only difference between the pressure at the rear wall's upper and lower area is the static pressure, the pressure difference between the front-opening and the rear-wall is the same at any depth level in the concentrator, that is, the pressure difference is close to a equivalent of 16 m of hydraulic head, independent of the hole position at the rear wall (upper or lower). FIG. 6 shows the water flowing speed of the simulation result, when the five rear wall round holes are not connected to any pipes, the average outflow speed is 15.36 m/s (equivalently about 12 m in hydraulic head, i.e. with about 4 m entry loss at the hole entrance), so the concentrator can speed up a 1 m/s ocean current to about its 15 times through the holes. Since the concentrator's front-opening area and rear-hole opening has an area ratio of 51:1 (100 m×50 m vs. 5×19.6 m^2), which means when the area concentration ratio is 51 to 1, the concentrator can only speed up the flowing speed to 15 times but not 51 times, it is because the concentrator is placed at an open sea. FIG. 7 shows the water flow in the concentrator by vector arrows, from the velocity scale bar in FIG. 7, the maximum transient outflow speed at the rear holes is 18.08 m/s, and the water flows much slower than 1 m/s in the concentrator.

According to previous paragraphs, the pool 2 can be left floating on the sea and anchored to the seabed, please refer to FIG. 8, a floating pool 2 is shown, the floating pool 2 is anchored to the seabed, and the pipe 1 with its concentrator is installed right beneath the pool 2, the concentrator is of the same size of FIG. 4. A floating pool has the capability to collect the stronger ocean current near the sea surface. And since the pool 2 and the pipe 1 has the shortest distance, the friction loss of pipe 1 is relatively small and could even be ignored. From FIG. 4's simulation results, as when the ocean current power generation system in FIG. 8 is placed in a 1 m/s ocean current with a pipe 1 concentrator of 100 m width×50 m height×150 m long, the concentrator output flowing speed would be 15.36 m/s which is equal to about 12 m available hydraulic head (the pipe's friction loss is ignored due to its short length), since it requires both hydraulic head and flow-through volume for a hydro turbine generator to generate power, so in practical we can choose to transform part of the 12 m available hydraulic head into proper water flow for the hydro turbine generator. For example, if the draining of the pool is controlled to keep only 8 m water level in the pool for the hydro turbine generator, and the remaining 4 m hydraulic head (12 m−8 m=4 m) is left to generate a flow of water of 8.85 m/s (i.e. 4 m hydraulic head) from pipe 1, that is, when the total 5 round holes (with 19.6 m^2 cross section area each) of the concentrator can provide as much as 5*19.6*8.85=8673 cubic meters of inflow water per second, and the outflow of pipe 3 through the hydro turbine generator 4 is also controlled at 8673 cubic meters per second, the inflow would equal the outflow of water and the system will be in a balanced state and the water level in the pool will stay at 8 m high. At the constant draining rate, if the water level in the pool falls below 8 m, the inflow rate of water would increase and stop the water level from falling because the total hydraulic head is 12 m and the remaining hydraulic head for generating the inflow would increase if the water level falls below 8 m. If the water level rises above 8 m, the inflow rate of water would decrease and stop the water level from rising. At 8 m water level in the pool and 8673 cubic meters per second inflow/outflow rate, the 5 pipes can provide as much as 13.6 MW*5=68 MW of power (power=cross section area A*flow speed v*9.81*hydraulic head h=5*19.6*8.85*9.81*8=68065), if the hydro turbine generator has an efficiency of 70%, the available power from the hydro turbine generator would be 47.6 MW. If a different water level (other than 8 m) is required for the hydro turbine generator, we can simply change the outflow rate to have another balanced water level. For example, a lower drainage flow will result in a higher water level in the pool, and a higher drainage flow will result in a lower water level in the pool If the pool needs to be placed at the shore or at shallow waters away from the ocean current, for example, HDPE pipes (High Density Poly-Ethylene pipes) can be used to connect the pool and the concentrator, and to convey the collected offshore ocean current to the remote pool. Suppose the distance between the concentrator and the pool is 3 km, take the concentrator in FIG. 4 for example, its five round holes can be connected to five HDPE pipes of 3 km long to convey the water to the pool (i.e. a 3 km-long pipe 1). Since the FIG. 4 concentrator can generate 12 m hydraulic head under 1 m/s ocean current, if the hydro turbine generator requires 2.5 m of hydraulic head to operate, we have 12−2.5=9.5 m hydraulic head left for generating the flow, and by using the HDPE pipe friction loss calculator available from the Internet, after some trial calculations we can learn that a 5 m-diameter and 3 km-long HDPE pipe has a friction loss of 7.75 m when the flowing speed is 5.85 m/s (i.e. 1.74 m hydraulic head), so the total required hydraulic head would be 2.5 m+1.74 m+7.75 m=11.99 m, which is close to the available 12 m hydraulic head from the concentrator of FIG. 4, So with the concentrator of FIG. 4 which can provide 15.36 m/s water flow or equivalently 12 m hydraulic head, it is enough for the 3 km-away pool to operate and generate power, the available power would be 2812 KW*5=14.06 MW (power=cross section area A*flow speed v*9.81*hydraulic head h=5*19.6*5.85*9.81*2.5=14060), if the hydro turbine generator efficiency is 70%, the generated power would be 9.8 MW. If the pipe length is extended to 10 km, with the same 2.5 m hydraulic head reserved for the hydro turbine generator, after some trial calculation we learn that when the flowing speed is 3.3 m/s (i.e. 0.56 m hydraulic head), a 10 km HDPE pipe has a friction loss of 8.96 m, and the total required hydraulic head=2.5 m+0.56 m+8.96 m=12.02 m, also close to the 12 m hydraulic head available from the FIG. 4 concentrator under a 1 m/s ocean current, now the available power is reduced to 1586 KW*5=7.93 MW, with a 70% generator efficiency the generated power would be 5.55 MW. Although the above mentioned concentrator size, pipe diameter, pipe type, pipe length and hydro turbine generators have been described with certain parameters, the descriptions are not meant to be construed in a limiting sense.

In summary, the ocean current power generation system of the invention uses pipes to redirect the water current to flow on to the sea level, transforms the kinetic energy to potential energy, and then into electric energy. The preferred embodiment does not use high cost undersea turbine generators, and has the advantage of lower system cost, longer life time and easier maintenance, and is friendlier to the environment.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An ocean current power generation system, comprising:
    a water pool disposed near or at the sea with pool walls higher than the sea level to stop water flow and store sea water from the ocean current;
    at least one inlet pipe comprising:
        an exit connected near to a bottom of the water pool; and
        at least one entrance disposed at and facing an ocean current in the sea to redirect a part of the ocean current to flow by itself into the entrance to the exit and to the water pool and stored therein, wherein when the flowing-in ocean current reaches the water pool and is kept from flowing back to the sea by pool walls and stored, the kinetic energy of the flowing-in ocean current from the entrance is transformed into a potential energy when the flowing-in sea water is kept from flowing back to the sea by pool walls and stored in the water pool so the flowing-in ocean current creates a higher water level in the water pool higher than the sea level around the water pool;
    a drainage means comprising at least one outlet pipe or path connected near to the bottom of the water pool and has a drainage output to the sea below the sea level around the water pool, wherein the drainage output is near a shore where it's not near the ocean current, or the drainage output does not face the ocean current, wherein, when the water level of the stored sea water in the water pool is higher than the sea level around the water pool, the stored sea water in the water pool can be drained back to the sea of the lower sea level around the water pool through the outlet pipe or path;
    a generation device comprising:
        a flow control means to control the drainage flow to the outlet pipe or path, and to control the storage of water in the pool, wherein a lower drainage flow results in a higher water level in the pool, and a higher drainage flow results in a lower water level in the pool; and
        a hydro turbine generator disposed at the drainage path of the outlet pipe or path, and uses the draining water flow from the water pool to the outlet pipe or path to generate electric power.

2. The ocean current power generation system of claim 1, wherein the water pool is disposed at the shore.

3. The ocean current power generation system of claim 1, wherein the water pool is disposed at the surface of the sea, and is fixed by a supporting frame or anchored to the seabed.

4. The ocean current power generation system of claim 1, wherein the inlet pipe has an enlarged entrance as a concentrator to collect more ocean current.

* * * * *